(12) United States Patent
Holzapfel et al.

(10) Patent No.: US 11,162,776 B2
(45) Date of Patent: Nov. 2, 2021

(54) MEASURING DEVICE

(71) Applicant: DR. JOHANNES HEIDENHAIN GmbH, Traunreut (DE)

(72) Inventors: Wolfgang Holzapfel, Obing (DE); Markus Meißner, Übersee (DE); Michael Stepputat, Traunstein (DE); Robert Kraus, Trostberg (DE); Manuel Scherer, Traunstein (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 78 days.

(21) Appl. No.: 16/865,766

(22) Filed: May 4, 2020

(65) Prior Publication Data
US 2020/0348123 A1   Nov. 5, 2020

(30) Foreign Application Priority Data

May 2, 2019   (DE) ............. 10 2019 206 278.4

(51) Int. Cl.
*G01B 11/03* (2006.01)
*G01B 11/00* (2006.01)

(52) U.S. Cl.
CPC ........ *G01B 11/005* (2013.01); *G01B 2210/58* (2013.01)

(58) Field of Classification Search
CPC ................................................... G01B 11/005
(Continued)

(56) References Cited

U.S. PATENT DOCUMENTS

| 4,621,926 A | 11/1986 | Merry et al. |
| 4,691,446 A | 9/1987 | Pitches et al. |

(Continued)

FOREIGN PATENT DOCUMENTS

| DE | 3629689 A1 | 3/1987 |
| EP | 1658471 A1 | 5/2006 |

(Continued)

OTHER PUBLICATIONS

European Search Report issued in European Patent Application No. 20164011.7-1010 dated Oct. 8, 2020, pp. 1-2.

*Primary Examiner* — George B Bennett
(74) *Attorney, Agent, or Firm* — Carter DeLuca & Farrell LLP

(57) ABSTRACT

A measuring device includes a movable probe head and an optical position sensing device for determining the spatial position and orientation of the probe head relative to a reference point. The position sensing device includes at least three position determination modules, arranged as a transmission unit or as a receiving unit, at least one position determination module being situated on the probe head, and at least one position determination module being situated at the reference point. A transmission unit has transmission unit marking element(s). A receiving unit includes optoelectronic detector(s) and receiving unit marking element(s), positioned in a defined spatial relationship relative to the optoelectronic detector. Visual contacts exist between at least some of the position determination modules. The position determination module on the probe head and the position determination module at the reference point are connected by at least one uninterrupted chain of visual contacts.

15 Claims, 5 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 4,846,576 | A * | 7/1989 | Maruyama | G01B 11/00 356/604 |
| 4,942,671 | A * | 7/1990 | Enderle | G01B 11/007 33/556 |
| 5,917,181 | A * | 6/1999 | Yoshizumi | G01B 11/007 250/230 |
| 6,789,327 | B2 * | 9/2004 | Roth | G01B 7/012 33/556 |
| 6,995,836 | B1 | 2/2006 | Tondorf et al. | |
| 8,127,458 | B1 * | 3/2012 | Ferrari | G01B 5/012 33/503 |
| 8,233,153 | B2 | 7/2012 | Knuttel | |
| 8,474,150 | B2 * | 7/2013 | Groell | H04Q 9/00 33/558 |
| 9,222,769 | B2 * | 12/2015 | Garvey | G05B 19/401 |
| 10,557,701 | B2 * | 2/2020 | Jiang | G01B 9/02091 |
| 2020/0363187 | A1 * | 11/2020 | Haverkamp | G01B 11/005 |

FOREIGN PATENT DOCUMENTS

| | | | |
|---|---|---|---|
| EP | 1942312 | A1 | 7/2008 |
| EP | 2831624 | A1 | 2/2015 |
| EP | 3076892 | A1 | 10/2016 |
| WO | 0138828 | A1 | 5/2001 |
| WO | 2005019769 | A1 | 3/2005 |
| WO | 2013144649 | A1 | 10/2013 |
| WO | 2015075720 | A1 | 5/2015 |

* cited by examiner

MEASURING DEVICE

CROSS-REFERENCE TO RELATED APPLICATIONS

The present application claims priority to Application No. 10 2019 206 278.4, filed in the Federal Republic of Germany on May 2, 2019, which is expressly incorporated herein in its entirety by reference thereto.

FIELD OF THE INVENTION

The present invention relates to a measuring device, including, for example, a movable probe head. The spatial position and orientation of the probe head may be determined with the aid of an optical position sensing device.

BACKGROUND INFORMATION

A measuring device described, for example, in German Published Patent Application No. 36 29 689, includes a probe head, which is arranged as a touch probe, is positioned in space with the aid of a robot arm, and a workpiece to be measured in three dimensions is scanned by the touch probe. Using a multilateration method, an optical position sensing device determines the spatial position and orientation of the probe head, i.e., its pose. It includes a plurality of laser distance encoders, which ascertain the distance between stationary carriers and reference points on the probe head. Based on the ascertained distances, the pose of the probe head relative to the stationary carriers is determined with the aid of triangulation methods. In conjunction with the known geometry of the touch probe, the spatial position of the associated contact point on the workpiece surface is able to be ascertained in this manner on the basis of the measured pose of the probe head. Utilizing a multitude of contact points determined in this manner, the three-dimensional form of the scanned workpiece is able to be acquired through measurements.

A similar device is described in U.S. Pat. No. 4,621,926. In this instance, a coordinate measuring device is provided, which has a probe head arranged as a touch probe and is positioned in space via a bridge-type mechanical system in order to scan a workpiece in three dimensions. An optical position sensing device having three laser trackers is used for determining the spatial position and orientation of the probe head.

A precise determination of the pose of the probe head in these devices is ensured only if the stationary components of the respective optical position sensing device have a defined, invariant position in space in relation to the respective machine coordinate system. If thermally and/or mechanically induced shifts in position occur in these components, then errors can result when determining the spatial probe head pose with the aid of the position sensing device. In such an application, these errors then manifest themselves in the form of measuring errors during the three-dimensional measurement of the workpiece by the probe head.

Similar problems also result if the probe head is not arranged as a touch probe but, for instance, as a calibration tool for measuring a machine.

SUMMARY

Example embodiments of the present invention provide for improvements in measuring devices by reducing measuring errors during the probe head pose determination, these measuring errors being caused by, for example, thermally or mechanically induced shifts in position of components of the optical position sensing device that are seemingly stationary with respect to one another.

According to an example embodiment of the present invention, a measuring device includes a probe head, which is movable in space, and an optical position sensing device for determining the spatial position and orientation of the probe head in relation to a reference point. The position sensing device includes at least three position determination modules, which are arranged as a transmission unit or a receiving unit, at least one position determination module being situated on the probe head and at least one position determination module being situated at the reference point. At least one position determination module is arranged as a receiving unit. A transmission unit includes at least one transmission unit marking element. A receiving unit includes at least one optoelectronic detector and s at least one receiving unit marking element, which is situated in a defined spatial relationship with respect to the optoelectronic detector. Visual contact exists between at least some of the position determination modules. The at least one position determination module on the probe head and the at least one position determination module at the reference point are connected by at least one uninterrupted chain of visual contacts.

For example, at least two uninterrupted chains of visual contacts exist between the at least one position determination module on the probe head and the at least one position determination module at the reference point, these chains of visual contacts being connected to one another by at least one visual contact that exists between position determination modules that are situated between the probe head and the reference point in each case.

It may be the case that more than two uninterrupted chains of visual contacts are provided only in a first portion of the measuring range of the measuring device and only one uninterrupted chain of visual contacts exists in further, second portions of the measuring range.

The optoelectronic detectors of the receiving units may be thermally and/or mechanically connected to the at least one receiving unit marking element in an invariant manner with the aid of a carrier frame.

In addition, at least one scanning grating may be provided upstream from the optoelectronic detector in the receiving units in each case.

It is furthermore possible that the at least one transmission unit marking element and/or the at least one receiving unit marking element is/are arranged to be identifiable.

In this context, it may be provided that the at least one transmission unit marking element and/or the at least one receiving unit marking element is/are arranged as light source(s).

Moreover, for identification purposes, it is possible that the light sources are able to be selectively activated in terms of time via a control and evaluation device.

In addition, a control and evaluation device may be provided and configured to determine the angular position of a measured light source relative to the receiving unit on the basis of the position of a fringe pattern resulting on the optoelectronic detector of a receiving unit, so that the spatial pose of the probe head and of at least two position determination modules relative to the reference point is able to be determined via the identification of the at least one transmission unit marking element and/or the at least one receiving unit marking element.

It is furthermore possible that a control and evaluation device is provided and configured to determine both the spatial pose of the probe head and the spatial poses of the position determination modules relative to one another.

Additionally, it may be provided that each transmission unit includes at least three transmission unit marking elements and that each receiving unit includes at least three receiving unit marking elements.

It may be provided that a machine tool includes a measuring device as described herein. In this regard, the probe head is situated in a tool holder of the machine tool, and a workpiece which is situated on a workpiece table of the machine tool is able to be measured with the aid of the probe head. At least one position determination module is situated on the machine frame of the machine tool or on the workpiece table.

The probe head may be arranged as a touch probe.

It is furthermore possible that a position determination module, which is arranged as a transmission unit having at least three identifiable transmission unit marking elements, is situated on the workpiece table.

In addition, it is possible that a machine tool includes a measuring device as described herein and in which the probe head is situated on an end effector of a machine kinematic system. The deviation between the actual position of the end effector and the set setpoint position is able to be measured using the probe head, and at least one position determination module is situated on the machine frame of the machine or on a workpiece table.

Via the measures described herein, it is possible to ensure a correct determination of the spatial position of the probe head even in the event of thermally and/or mechanically induced shifts in position of the pose of seemingly stationary components of the optical position sensing device, e.g., the receiving units relative to one another. Possibly resulting measuring errors during the three-dimensional measurement of workpieces by the probe head or in the measurement of position errors of the machine kinematic system or in connection with other measuring tasks are thereby able to be avoided. In particular, no additional sensor system is required for measuring such shifting.

Further features and aspects of example embodiments of the present invention are described in more detail below with reference to the appended Figures.

BRIEF DESCRIPTION OF THE DRAWINGS

FIG. 2b is a schematic lateral cross-sectional view of the receiving unit illustrated in FIG. 2a.

DETAILED DESCRIPTION

A measuring device according to an example embodiment of the present invention is described with reference to FIGS. 1 to 3.

Figure 1:
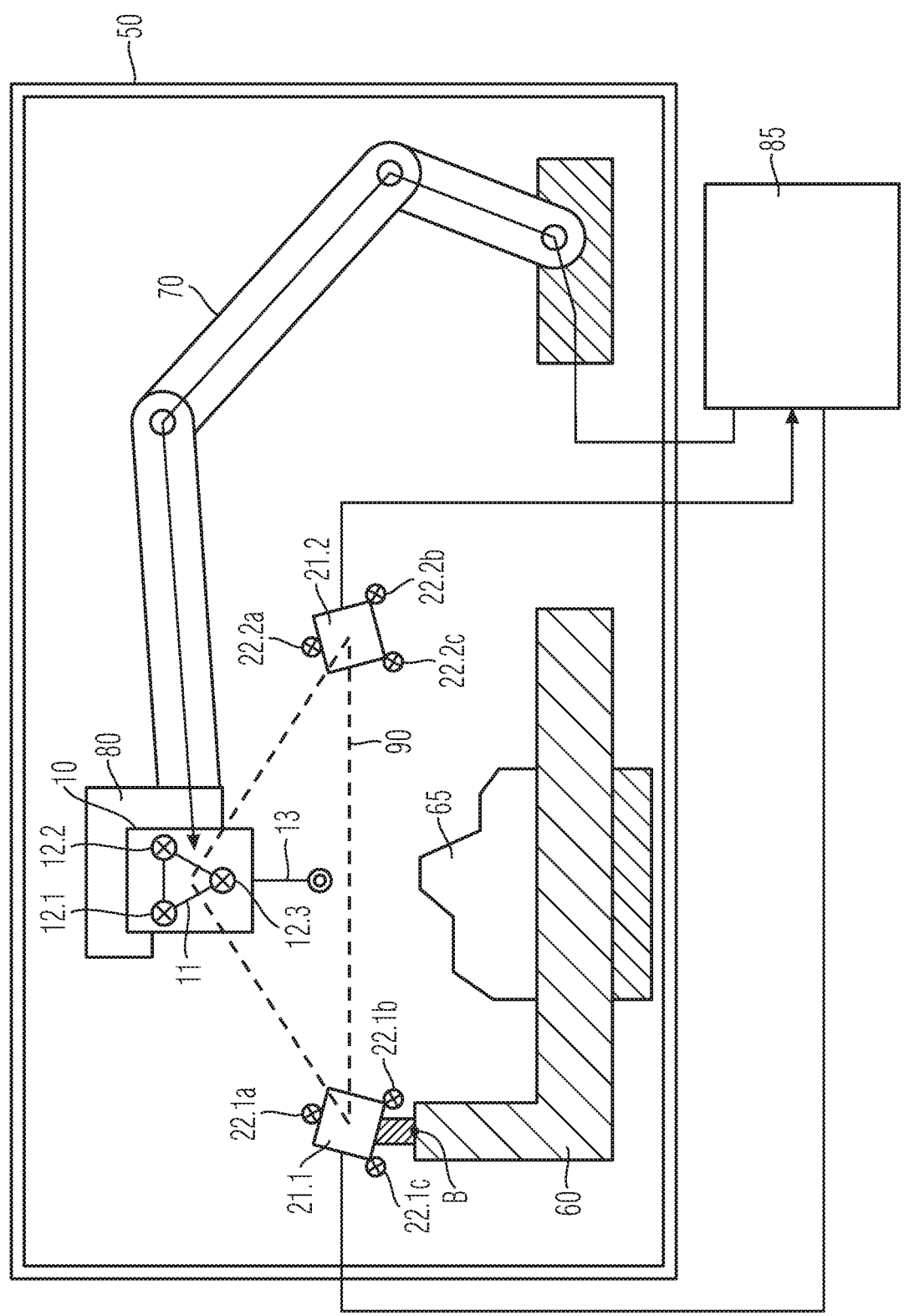
FIG. 1 schematically illustrates a measuring device according to an example embodiment of the present invention integrated into a machine tool provided with a robot kinematic system.

In this example embodiment, the measuring device is integrated into a machine tool, which is schematically illustrated in FIG. 1. Of the machine tool, only a machine frame 50, a workpiece table 60 together with a workpiece 65 situated thereon as well as a kinematic system 70 for the spatial positioning of a workpiece holder 80 using a probe head 10 are illustrated in the processing envelope. Kinematic system 70, schematically illustrated in FIG. 1, may be arranged as a robotic kinematic system or as a multi-axes kinematic system, for example, and allows tool holder 80 to be positioned along three orthogonal axes of movement and possibly about one or more additional rotational axes. It is also possible to use additional kinematic systems for the spatial positioning of probe head 10 relative to workpiece table 60 in conjunction with the measuring device.

Probe head 10, which is situated in tool holder 80 of the machine tool in this example embodiment and is movable in space with the aid of kinematic system 70, is part of the measuring device. In this instance, a switching touch probe, which is able to be positioned in space in the work envelope of the machine tool, is able to measure a workpiece 65 clamped on workpiece table 60 through tactile probing with the aid of a stylus 13. Alternatively, probe head 10, able to be positioned in space via kinematic system 70, may also be provided as a measuring touch probe, as an optical touch probe, a capacitive distance sensor, a calibration tool, etc. Therefore, probe head 10 need not necessarily be used for sensing the contour of a workpiece 65 but can also be used in connection with many other measuring tasks such as for measuring the positioning errors of respective kinematic system 70. In general, probe head 10 is a component that is able to be positioned in space via a machine kinematic system. Depending on the specific configuration and measuring task, different sensor systems are able to be installed on probe head 10.

In addition, an optical position sensing device, which is used for determining the spatial position and orientation of probe head 10 in relation to a reference point B, is part of the measuring device. This is also referred to as the pose of probe head 10. Reference point B or the reference system in relation to which the probe head pose is determined may be defined in an application-specific manner. In this instance, this may be a defined point on machine frame 50, for example, or else, as in the present example, a point on workpiece table 60 on which workpiece 65 is clamped.

In the current exemplary embodiment, the position sensing device includes a plurality of spatial 2D angle measuring systems as described, for example, in PCT Patent Application Publication No. WO 01/38828, which is expressly incorporated herein in its entirety by reference thereto.

The position sensing device includes at least three position determination modules, which are arranged either as a transmission unit or a receiving unit. At least one position determination module is situated on probe head 10, and at least one position determination module is situated at reference point B. At least one position determination module of the position sensing device is arranged as a receiving unit.

In the exemplary embodiment illustrated in FIG. 1, a position determination module is arranged as a transmission unit 11 situated on probe head 10. In this instance, it has a plurality of transmission unit marking elements 12.1, 12.2, 12.3, which are situated in a defined spatial relationship to one another and have an identifiable configuration. In contrast thereto, depending on the measuring task and the number and placement of the position determination modules, even a single transmission unit marking element may be sufficient. In this particular exemplary embodiment, three light sources in a triangular arrangement are provided as transmission unit marking elements 12.1, 12.2, 12.3. Suitable light sources may be provided as LEDs, for instance, and a selective activation of these light sources in terms of time with the aid of a control and evaluation device 85 may be provided in order to identify the individual light sources. Alternatively, an identification of the transmission unit marking elements 12.1, 12.2, 12.3 arranged as light sources may also be performed in another manner, such as, for example, by using light sources that have different emission wavelengths, etc.

In the illustrated exemplary embodiment, which represents a minimal configuration of the measuring device, two position determination modules, which are arranged as receiving units 21.1, 21.2, are part of the position sensing device in addition to transmission unit 11. At least one receiving unit marking element is allocated to receiving units 21.1, 21.2 in each case. As in the illustrated example, three receiving unit marking elements 22.1$a$, 22.1$b$, 22.1$c$, 22.2$a$, 22.2$b$, 22.2$c$ may be provided. A first receiving unit 21.1 is situated on workpiece table 60 and rigidly connected thereto and thus rigidly connected to workpiece 65. In this exemplary embodiment, first receiving unit 21.1 thus represents the particular position determination module that is rigidly positioned at reference point B or the reference system. A second receiving unit 21.2 may be placed in any position across from it as long as the conditions with regard to the required visual contacts with other components of the position sensing device, which are described below, are satisfied. In this context, it is also be possible to position second receiving unit 21.2 on machine frame 50.

If only two receiving units are used, at least one of the two receiving units should be rigidly positioned on the reference system or should be rigidly connected to reference point B of the respective application. If a workpiece measurement is involved, workpiece table 60 on which workpiece 65 is firmly mounted usually constitutes the reference system. In a case in which the position sensing device measures the respective kinematic system, a suitably selected machine coordinate system on machine frame 50 or on workpiece table 65 may alternatively also function as the reference system.

The two receiving units 21.2, 21.2 or position determination modules are situated so that they have direct visual contact or mutual lines of sight, the different lines of sight being indicated by dashed lines in FIG. 1. A plurality of optical measuring paths for optical measurements of the 2D angle measuring systems of the position sensing device extend along or in parallel with the different lines of sight. For reasons of better clarity, the individual optical measuring paths along the lines of sight are not indicated in FIG. 1.

The presence of a visual contact between two receiving units 21.1, 21.2 is mentioned here if uninterrupted lines of sight exist from at least one of the two receiving units 21.1, 21.2 to at least one receiving unit marking element, e.g., to at least three receiving unit marking elements 22.1$a$, 22.1$b$, 22.1$c$, 22.2$a$, 22.2$b$, 22.2$c$, of the other receiving unit 21.1, 21.2, and valid measured values are therefore able to be determined. Visual contact is similarly available between a receiving unit 21.1, 21.2 and transmission unit 11 if uninterrupted lines of sight exist from at least one transmission unit marking element, e.g., at least three transmission unit marking elements 12.1, 12.2, 12.3, to receiving unit 21.1, 21.2.

In general, in the measuring device, it is necessary that visual contact exists between at least some of the position determination modules of the position sensing device. The at least one position determination module on probe head 10 and the at least one position determination module at reference point B are connected to one another by at least one uninterrupted chain of visual contacts.

In the exemplary embodiment illustrated in FIG. 1, such an uninterrupted chain is formed by visual contact between first receiving unit 21.1 and transmission unit 11. Another uninterrupted chain of visual contacts includes the visual contacts between first receiving unit 21.1 and second receiving unit 21.2 and between second receiving unit 21.12 and the transmission unit.

Thus, there are two uninterrupted chains of visual contacts between the at least one position determination module on probe head 10 and the at least one position determination module at reference point B.

In a special case, it may additionally be provided that two or more uninterrupted chains of visual contact are present only in a first portion of the measuring range of the measuring device and that only one uninterrupted chain of visual contacts is present in additional, second portions of the measuring range. For example, this case may arise when visual contacts are interrupted in a portion of the measuring range that are available in other ranges, this being caused by shading in a portion of the measuring range, for example.

In the illustrated example of FIG. 1, the positioning of receiving units 21.1, 21.2 in the machine tool goes beyond the previously mentioned minimum requirement insofar as the at least two uninterrupted chains of visual contacts between transmission unit 11 and probe head 10 form a closed network which connects all receiving units 21.1, 21.2 and transmission unit 11 to one another. This network or the corresponding visual contacts is/are not interrupted in the measuring operation whenever possible. Such a closed network of visual contacts may achieve even higher accuracy in the determination of the probe head pose. A closed network of visual contacts is characterized in that at least two receiving units 21.1, 21.2 having visual contact with transmission unit 11 are in visual contact with at least one other receiving unit 21.1, 21.2 which has visual contact with probe head 10. Each receiving unit 21.1, 21.2 having visual contact with probe head 10 thus has visual contact with at least one other receiving unit 21.1, 21.2. The corresponding network of visual contacts is provided with reference numeral 90 in FIG. 1. Network 90 has the line of sight or visual contact between the two receiving units 21.1, 21.2 and also the lines of sight between transmission unit 10 and the two receiving units 21.1, 21.2. As an alternative to the minimum configuration of the device illustrated in FIG. 1, it is also possible to provide more than two receiving units 21.1, 21.2, which means that the produced network includes a correspondingly greater number of lines of sight.

At least one detector and at least one identifiable receiving unit marking element, e.g., three receiving unit marking elements 22.1$a$, 22.1$b$, 22.1$c$, 22.2$a$, 22.2$b$, 22.2$c$ as illustrated, is/are provided per receiving unit 21.1, 21.2, which are situated in a defined spatial relationship to the detector of the respective receiving unit 21.1, 21.2. In this example, receiving unit marking elements 22.1$a$, 22.1$b$, 22.1$c$, 22.2$a$, 22.2$b$, 22.2$c$ are arranged as identifiable light sources or LEDs, similar to transmission unit marking elements 12.1, 12.2, 12.3. For the identification of the individual light sources, a selective activation of the light sources in terms of time with the aid of control and evaluation device 85 is also provided, for example. It is also possible to provide an alternative identification with regard to receiving unit marking elements 22.1$a$, 22.1$b$, 22.1$c$, 22.2$a$, 22.2$b$, 22.2$c$.

Figure 2B:
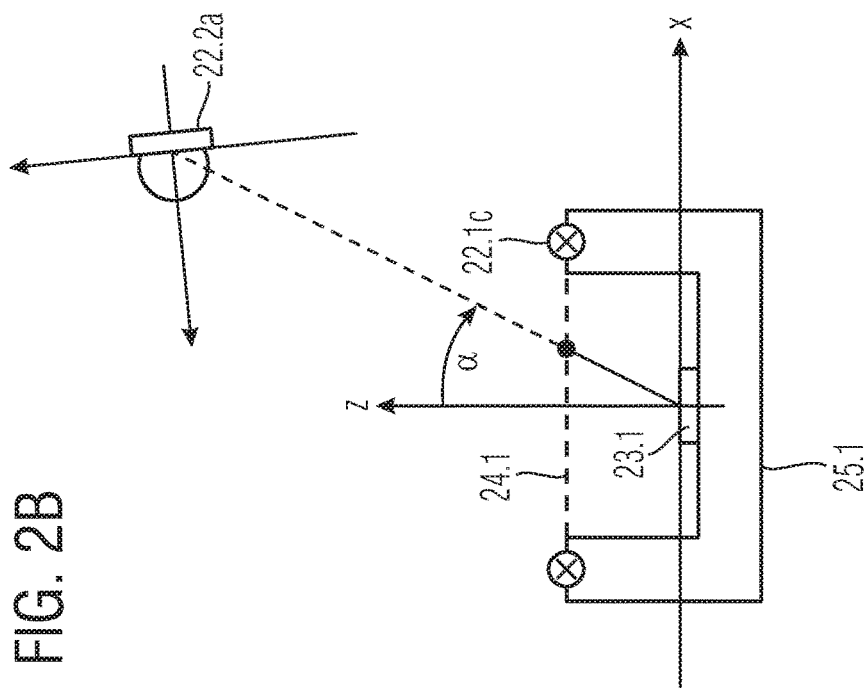
Figure 2A:
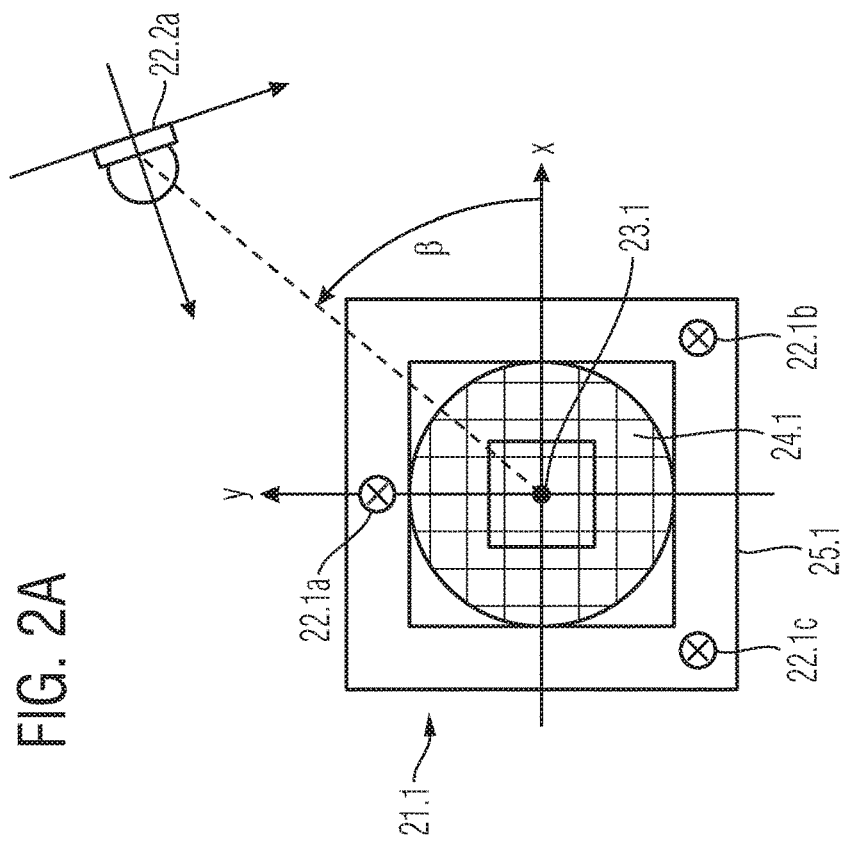
FIG. 2a is a schematic top view of a receiving unit of the exemplary embodiment illustrated in FIG. 1.
Figure 2D:
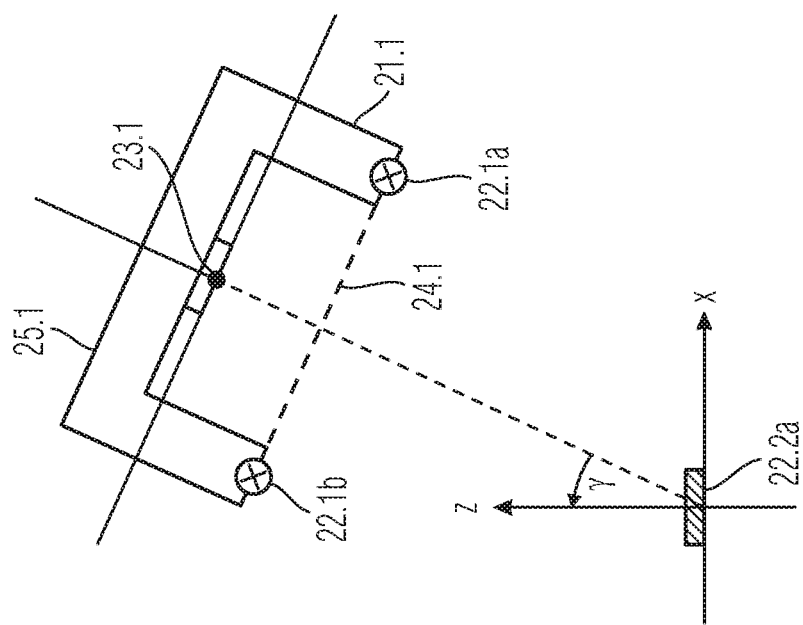
FIGS. 2c and 2d schematically illustrate different light source emission angles.
Figure 2C:
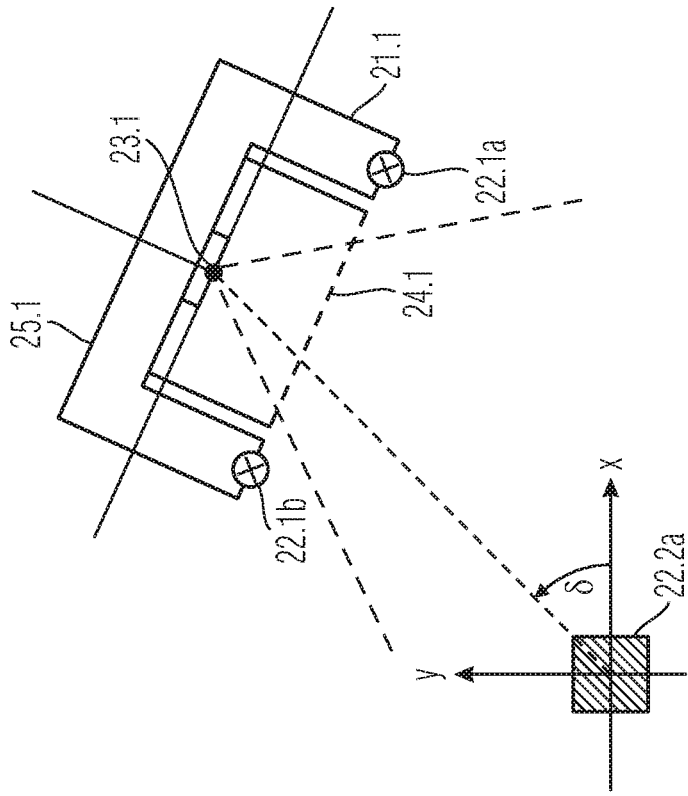

FIGS. 2a and 2b illustrated one of the two receiving units 21.1 from the example embodiment illustrated FIG. 1 in a top view as well as in a cross-sectional side view in conjunction with a receiving unit marking element 22.2a of the other receiving unit 21.2. The basic structure of the position determination modules of the position sensing device, which are arranged as receiving units 21.1, 21.2, is described with reference to these Figures. An optoelectronic detector in the form of what is referred to as a structured photodetector functions as detector 23.1 in receiving unit 21.1 illustrated in FIGS. 2a and 2b. It has a multitude of periodically arranged, light-sensitive detector elements in a detection plane. Detector 23.1 is situated on the bottom part in the interior of a trough-shaped carrier frame 25.1. The radiation-sensitive area of detector 23.1 has an upward orientation, i.e., in the direction of the opening of carrier frame 25.1. A scanning grating 24.1, which is arranged as a periodic transmission grating, is situated upstream from detector 23.1 or its radiation-sensitive area. Receiving unit marking elements 22.1a to 22.1c are rigidly connected via carrier frame 25.1 to detector 23.1.

A periodic fringe pattern resulting in the detection plane is produced with the aid of optoelectronic detector 23.1. It is produced by the reciprocal effect between the beam bundles emitted by a marking element and scanning grating 24.1. The corresponding beam bundle may originate from one of transmission unit marking elements 12.1, 12.2, 12.3 of transmission unit 11 or else, as illustrated in FIGS. 2a to 2d, from one of receiving unit marking elements 22.2a of a different receiving unit 21.2. Only a single receiving unit marking element 22.2a, which is situated on second receiving unit 21.2, is illustrated in FIGS. 2a to 2d, for example. The position of the fringe pattern produced in this manner on detector 23.1 depends on the direction of incidence of the radiation of measured marking element 22.2a relative to respective receiving unit 21.1. Scanning grating 24.1 of receiving unit 21.1 may be arranged as a two-dimensional cross grating, and optoelectronic detector 23.1 may be arranged as a two-dimensional detector. In this manner, two angles of incidence that are aligned with the main directions of two-dimensional scanning grating 24.1 are able to be determined based on the position of the produced two-dimensional fringe pattern on detector 23.1. In other words, the direction of incidence of the light beam coming from respective marking element 22.2a, or the angular position of the measured light source, is/are able to be metrologically acquired for corresponding receiving unit 21.1 by evaluating the fringe pattern position on detector 23.1. This is therefore also referred to as a spatial 2D angle measuring system in the context of the corresponding position sensing device. With regard to further details of the optical mode of action of the employed position sensing device, reference is once again made to PCT Patent Application Publication No. WO 01/38828.

Using any 2D angle measuring system of the position sensing device, it is therefore possible to determine the two receiving angles $\alpha$, $\beta$ of the optical beam that connects the respective receiving unit 21.1, 21.2 to the active marking element on probe head 10 or on some other receiving unit 21.1, 21.2. In this case receiving angles $\alpha$, $\beta$ are determined relative to scanning grating 24.1 of respective receiving unit 21.1, 21.2 and correspond approximately to angles $\alpha$, $\beta$ of the line of sight which points from receiving unit 21.1, 21.2 to respective marking element 12.1 to 12.3, 22.1a to 22.1c, 22.2a to 22.2c.

To determine the probe head pose in the case of the spatially invariant placement of receiving units 21.1, 21.2, it should suffice to sequentially activate the individual transmission unit marking elements 12.1 to 12.3 during the measuring operation for identification purposes with the aid of control and evaluation circuit 85, and to determine for each activated transmission unit marking element 12.1 to 12.3 the respective two measured angle values for all receiving units 21.1, 21.2 that are able to receive the light of the active marking element, and the active marking element. Because of the known geometrical position of transmission unit 11 or transmission unit marking elements 12.1 to 12.3 on probe head 10, the determination of the spatial position and orientation of probe head 10 or its pose in relation to machine frame 50 is thereby possible.

To provide a high accuracy in such a position determination, workpiece 65 is rigidly connected to workpiece table 60 and the position of receiving units 21.1, 21.2 relative to each other and to workpiece table 60 is additionally known as precisely as possible and does not vary over time. In such a case, it is not necessary to sense the movement of workpiece table 60.

Depending on the individual machine kinematic system, however, this cannot be ensured under all circumstances. For example, undefined relative movements of receiving units 21.1, 21.2 with respect to one another, and thus relative to workpiece table 60 and workpiece 65 situated thereon, may occur due to vibrations of machine frame 50 and/or thermal influences. This, in turn, causes inaccuracies in the determination of the probe head pose relative to workpiece table 60 or the reference point.

For this reason, it is provided that possible mutual physical shifting of receiving units 21.1, 21.2 during the measuring operation is metrologically sensed and the corresponding shifting is taken into account when the probe head pose is determined. For this purpose, at least one, e.g., three, receiving unit marking element(s) 22.1a, 22.1b, 22.1c, 22.2a, 22.2b, 22.2c is/are allocated to the seemingly stationary or spatially invariant receiving units 21.1, 21.2, the receiving unit marking element(s) being situated in a defined relative position with respect to the detector of the corresponding receiving unit 21.1, 21.2 in each case. In the illustrated exemplary embodiment, the positioning of a total of three receiving unit marking elements 22.1a to 22.1c, 22.2a to 22.2c per receiving unit 21.1, 21.2 is provided, which are positioned in a centered manner around the center point of detector 23.1. It is also possible to provide a different spatial arrangement of the at least three receiving unit marking elements 22.1a to 22.1c, 22.2a to 22.2c in each case, e.g., an L-shaped arrangement. Of importance with regard to the spatial positioning of receiving unit marking elements 22.1a to 22.1c, 22.2a to 22.2c is only that a defined relative position exists to detector 23.1. In order to ensure this defined relative position of receiving unit marking elements 22.1a to 22.1c, 22.2a to 22.2c to detector 23.1, receiving unit marking elements 22.1a to 22.1c, 22.2a to 22.2c are connected to detector 23.1 via carrier frame 25.1, this carrier frame 25.1, for example, being arranged to be thermally and/or mechanically invariant. Carrier frame 25.1 may be produced from a material, such as Invar, Zerodur, carbon, etc., which provides the thermal and/or mechanical invariance properties.

Through this measure, it is possible to sense not only the spatial probe head pose during the measuring operation with the aid of control and evaluation device 85, but also the spatial poses of the further receiving units 21.2. In this context, it is assumed that the pose of the randomly selected receiving unit 21.1 is known which is in a neutral position with respect to the reference system or reference point B of the application, i.e., workpiece table 60 or the machine coordinate system.

Similar to the afore-described procedure during the measurement of the probe head pose, the receiving unit marking elements 22.2a to 22.2c allocated to further receiving unit 20.2 are sequentially activated in addition to transmission unit marking elements 12.1 to 12.3 with the aid of control and evaluation device 85, and the two measured angle values are ascertained for all receiving units and the active receiving unit marking elements 22.2a to 22.2c on the further receiving unit 20.2 are determined in each case. In a similar manner, it is additionally also possible to sense receiving unit marking elements 22.1a to 22.1c of first receiving unit 21.1 via second receiving unit 21.2. If sufficient valid measurements are available, both the respective pose of further receiving unit 20.2 and the probe head pose are thereby able to be determined. Possible spatial shifting of further receiving units 21.2 while determining the spatial probe head pose is thus able to be compensated for, which results in greater accuracy in the determination of the probe head pose relative to workpiece 65 to be measured, and thus in measuring of workpiece 65 with the aid of probe head 10.

For the mutual pose sensing of the different receiving units 21.1, 21.2, at least one, e.g., three, receiving unit marking element(s) 22.1a to 22.1c or 22.2a to 22.2c of detected receiving unit 21.1, 21.2 should be sensed by measuring receiving unit 21.1, 21.2 in order to provide for a complete determination of the respective receiving unit pose.

Such a metrological detection of shifting of the receiving units may also be performed on the basis of another receiving unit provided its pose is known or provided this receiving unit is in a neutral position in relation to the application-specific reference system, i.e., in relation to the machine coordinate system or in relation to workpiece table 65, or is moved together with workpiece table 65.

Through the above-described procedure, mutual sensing of the poses of the different receiving units, and thus the creation of a virtual metrology frame for sensing probe head 10, is possible. This provides that even possible shifting of receiving units 21.1, 21.2, which may occur for thermal and/or mechanical reasons, will be taken into account in the measurements.

Figure 3:
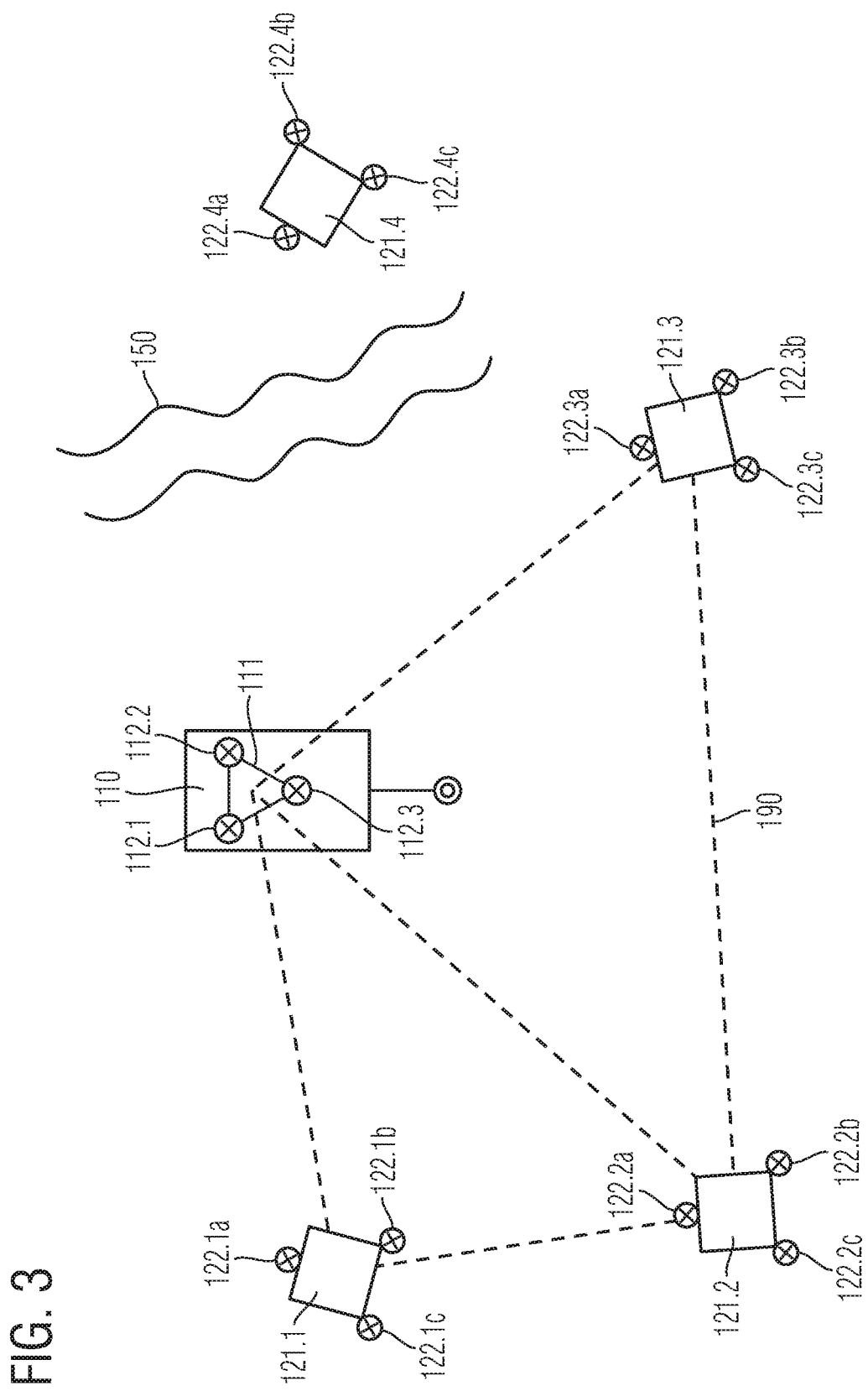
FIG. 3 schematically illustrates the functionality of the measuring device.

The scenario of using more than two receiving units for sensing the pose of a probe head is schematically illustrated in FIG. 3. For example, this may be necessary when individual visual contacts are interrupted during a measuring operation on account of mechanical circumstances and no determination of the probe head pose is therefore possible with the aid of the minimum configuration of two receiving units on the basis of the available information. The reason may be shading of individual visual contacts by tilted machine components, etc. In the variant illustrated FIG. 3, for example, a total of four position determination modules is provided, which are arranged as receiving units 121.1 to 121.4, which in turn have three receiving unit marking elements 122.1a to 122.1c, 122.2a to 122.2c, 122.3a to 122.3c, 122.4a to 122.4c, in each case. Situated on probe head 110 is a position determination module, which is arranged as a transmission unit 111 and includes three transmission unit marking elements 112.1 to 112.3. Similar to FIG. 1, the visual contacts or lines of sight between receiving units 121.1 to 121.3 and transmission unit 111 on probe head 110 are indicated by dashed lines. In the illustrated measuring situation, a closed network 190 of visual contacts between the three receiving units 121.1 to 121.3 among one another and visual contacts between transmission unit 111 and individual receiving units 121.1 to 121.3 is present. An obstacle 150 blocks the visual contact of fourth receiving unit 121.4 to the other receiving units 121.1 to 121.3 and/or to transmission unit 111 in the current measuring situation. The closed network 190, which may be required for sensing the pose and which connects at least two receiving units 121.1 to 121.3 and transmission unit 111 to one another, is thus defined by the three receiving units 121.1 to 121.3 and transmission unit 111 in this measuring situation. Fourth receiving unit 121.4, whose visual contact to other receiving units 121.1 to 121.3 and/or to transmission unit 111 is blocked just then, is not used for the pose determination.

In order to allow for the mutual sensing of poses in the afore-described manner, it should generally be ensured in terms of the required visual contact between the different receiving units that the mutual positioning of the receiving units is such that, taking the spatial detector receiving angle into account, the detector of each receiving unit is positioned in the region of the spatial emission angles of at least three receiving unit marking elements of the at least one other receiving units. This relationship is indicated in principle in two-dimensional representations in FIGS. 2a to 2d, the receiving angles $\alpha$, $\beta$ allocated to detector 23.1 in these Figures, and also the emission angles $\gamma$, $\delta$ allocated to receiving unit marking element 22.2a indicating the azimuth or elevation angle in the respective plane. As a result, receiving angles $\alpha$, $\beta$ define the angular position of receiving unit marking element 22.2a relative to sensing receiving unit 12.1. In a similar manner, emission angles $\gamma$, $\delta$ define the angular position of sensing receiving unit 21.1 relative to measured receiving unit marking element 22.2a.

Figure 4:
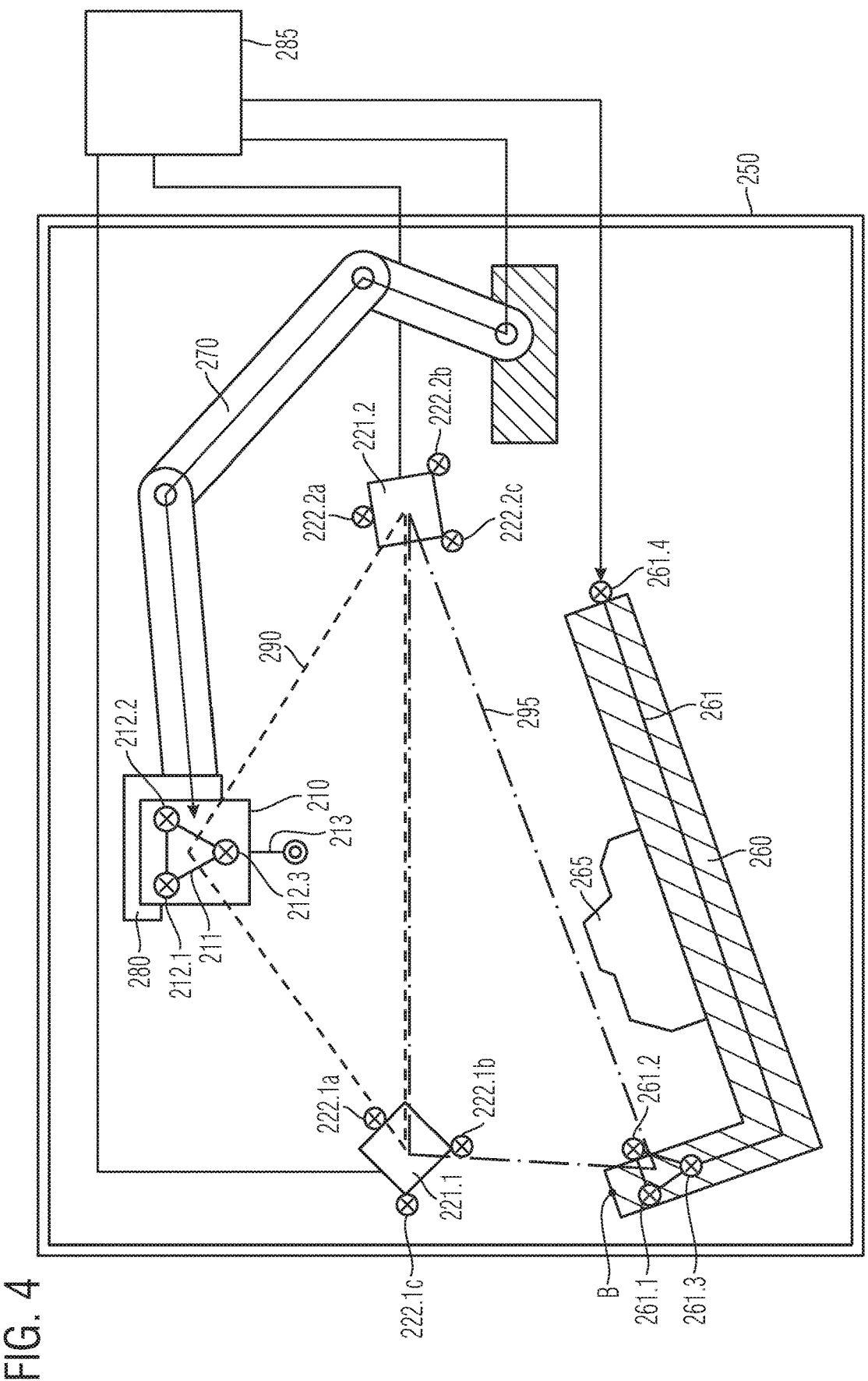
FIG. 4 schematically illustrates a measuring device according to an example embodiment of the present invention.

The example embodiment illustrated FIG. 1 having only two receiving units 21.1, 21.2 provides for a rigid placement of first receiving unit 21.1 on workpiece table 60 or the reference point. With that, a rigid reference of first receiving unit 21.1 in relation to workpiece 65 on workpiece table 60 is given at the same time, the workpiece being measured with the aid of probe head 10. If in a deviation therefrom, the pose of the randomly selected first receiving unit relative to the workpiece coordinate system is unknown, then additional measures will be required to be able to establish a spatial relationship between this receiving unit and the workpiece. Such a case is described in greater detail with reference to FIG. 4. Similar to FIG. 1, FIG. 4 illustrates a probe head 210, which is able to be positioned in the processing envelope of a machine tool via a kinematic system 270 in order to measure a workpiece 265 clamped on a workpiece table 260 there, reference numeral 250 denoting the schematically illustrated machine frame. As in the above example, transmission unit 211 on probe head 210 having three transmission unit marking elements 212.1 to 212.3 is part of the position sensing device. The position sensing device furthermore has two receiving units 221.1, 221.2. However, in contrast to the exemplary embodiment described above, none of these two receiving units 221.1, 221.2 is rigidly connected to workpiece table 260 or to workpiece 265 situated thereon. In other words, a reference of at least one receiving unit 221.1, 221.2 to workpiece table 260 or workpiece 265 has to be established in another manner due to the lack of an existing rigid mechanical coupling. In the illustrated example embodiment, this is accomplished with the aid of a further position determination module 261 in the form of a transmission unit on workpiece table 260, which has a total of four transmission unit marking elements 261.1 to 261.4. This results in a total of four identifiable light sources, which are rigidly disposed on workpiece table 260 and whose spatial poses are metrologically able to be sensed with the aid of the two receiving units 221.1, 221.2. In a minimal configuration, a transmission unit that has at least three transmission unit marking elements that are rigidly coupled with the workpiece in this manner would be required. The identification of the light sources may be performed via a selective activation by control and evaluation unit 285, for example, but other methods are possible as well, as mentioned above.

Similar to the example embodiment discussed above, two continuous chains of visual contacts between the at least one position determination module on probe head 210 and the at least one position determination module at reference point B are thus provided in the variant illustrated in FIG. 4 as well. These chains of visual contacts are furthermore connected to one another by at least one visual contact that exists between position determination modules that are situated between probe head 210 and reference point B in each case. In the visual contact mentioned last, this involves the visual contact between first and second receiving unit 221.1, 221.2 in this particular example.

Similar to the example embodiment illustrated in FIG. 1, the two connected chains of visual contacts create a closed network 290 of mutual visual contacts between receiving units 221.1, 221.2, and visual contacts are established between receiving units 221.1, 221.2 and transmission unit 211 on probe head 210, this network 290 being referred to as a first network. In addition, another network 295 of visual contacts exists between the two receiving units 221.1, 221.2 and transmission unit marking elements 261.1 to 261.4 on workpiece table 260, referred to as a second network 295. The spatial position of probe head 210 in relation to workpiece table 260 as the reference point, and thus in relation to workpiece 265, is continuously ascertained during the measuring operation, via continuously performed, identifiable measurements along lines of sight of the two networks 290, 295.

In addition to the above-described exemplary embodiments, there are additionally options within the spirit and scope hereof.

For example, passive marking elements rather than selectively activatable light sources are used. Toward this end, fluorescent marking elements, for example, may be provided, which are selectively activated with the aid of a light source or a plurality of light sources in order to carry out the corresponding measurements with the aid of the receiving units. No active light sources with a corresponding current supply have to be positioned on the workpiece table in this case.

Moreover, the measuring device may be used not only in machine tools but also in other machines or else in coordinate measuring devices equipped with different kinematic systems.

In this case, the probe head may be situated on an end effector of the machine kinematic system, for example, and the probe head is used to measure the deviation between the actual position of the end effector and the adjusted setpoint position. At least one receiving unit will again be placed on the machine frame of the machine or on a workpiece table.

What is claimed is:

1. A measuring device, comprising:
a spatially-movable probe head;
an optical position sensing device adapted to determining a spatial position and orientation of the probe head relative to a reference point, the position sensing device including at least three position determination modules, arranged as a transmission unit, including at least one transmission unit marking element, or as a receiving unit, including at least one optoelectronic detector and at least one receiving unit marking element arranged in a defined spatial relationship relative to the optoelectronic detector, at least one position determination module arranged on the probe head, at least one position determination module arranged at the reference point, at least one position determination module arranged as a receiving unit;
wherein visual contacts exist between at least some of the position determination modules; and
wherein the position determination module arranged on the probe head and the determination module arranged at the reference point are connected by at least one uninterrupted chain of visual contacts.

2. The measuring device according to claim 1, wherein at least two uninterrupted chains of visual contacts are provided between the position determination module on the probe head and the position determination module at the reference point, the chains of visual contacts being connected to one another by at least one visual contact between position determination modules that are provided between the probe head and the reference point.

3. The measuring device according to claim 1, wherein more than two uninterrupted chains of visual contact are provided only in a first portion of a measuring range of the measuring device and only one uninterrupted chain of visual contacts is provided in further, second portions of the measuring range.

4. The measuring device according to claim 1, wherein the optoelectronic detectors of the receiving units are thermally and/or mechanically connected to the receiving unit marking element in an invariant manner via a carrier frame.

5. The measuring device according to claim 1, wherein at least one scanning grating is provided upstream from the optoelectronic detector in the receiving unit.

6. The measuring device according to claim 1, wherein the transmission unit marking element and/or the receiving unit marking element is identifiable.

7. The measuring device according to claim 6, wherein the transmission unit marking element and/or the receiving unit marking element includes a light source.

8. The measuring device according to claim 7, wherein the light source is selectively activatable in time by a control and evaluation device for identification purposes.

9. The measuring device according to claim 7, wherein the control and evaluation device is adapted to determine an angular position of a measured light source relative to the receiving unit based on a position of a fringe pattern resulting on the optoelectronic detector of a receiving unit, so that a spatial pose of the probe head and of at least two position determination modules relative to the reference point are determinable via identification of the transmission unit marking element and/or the receiving unit marking element.

10. The measuring device according to claim 6, further comprising a control and evaluation device adapted to determine a spatial pose of the probe head and spatial poses of the position determination modules relative to one another.

11. The measuring device according to claim 1, wherein each transmission unit includes at least three transmission unit marking elements, and each receiving unit includes at least three receiving unit marking elements.

12. A machine tool, comprising:
a measuring device as recited in claim 1;

wherein the probe head is arranged in a tool holder of the machine tool and is adapted to measure a workpiece provided on a workpiece table of the machine tool; and wherein the position determination module is arranged on a machine frame of the machine tool or on the workpiece table.

13. The machine tool according to claim 12, wherein the probe head is arranged as a touch probe.

14. The machine tool according to claim 12, wherein a position determination module, which is arranged as a transmission unit having at least three identifiable transmission unit marking elements, is provided on the workpiece table.

15. A machine, comprising:

a measuring device as recited in claim 1;

wherein the probe head is arranged on an end effector of a machine kinematic system;

wherein the probe head is adapted to measure a deviation between an actual position of the end effector and a set setpoint position; and wherein at least one position determination module is arranged on a machine frame of the machine or on a workpiece table.

\* \* \* \* \*